US011535129B1

(12) United States Patent
Suzuki et al.

(10) Patent No.: US 11,535,129 B1
(45) Date of Patent: Dec. 27, 2022

(54) VEHICLE SEAT MOUNTING BRACKET FOR ENERGY ATTENUATING MEMBER

(71) Applicant: Honda Motor Co., Ltd., Tokyo (JP)

(72) Inventors: Junichi Suzuki, Royal Oak, MI (US); Fernando M. Rosero, Rochester Hills, MI (US); Eric D. Daume, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/404,905

(22) Filed: Aug. 17, 2021

(51) Int. Cl.
| B60N 2/42 | (2006.01) |
| B60N 2/427 | (2006.01) |
| B60N 2/68 | (2006.01) |

(52) U.S. Cl.
CPC ....... *B60N 2/42736* (2013.01); *B60N 2/4221* (2013.01); *B60N 2/68* (2013.01)

(58) Field of Classification Search
CPC . B60N 2/4221; B60N 2/4228; B60N 2/42745
See application file for complete search history.

(56) References Cited

U.S. PATENT DOCUMENTS

| 3,985,388 | A | * | 10/1976 | Hogan | B60N 2/42709 |
| | | | | | 297/216.17 |
| 4,523,730 | A | * | 6/1985 | Martin | B64D 25/04 |
| | | | | | 297/216.13 |
| 5,758,859 | A | * | 6/1998 | Gonzalez | B60N 2/505 |
| | | | | | 248/420 |
| 7,198,289 | B2 | | 4/2007 | Takahara | |
| 8,840,163 | B1 | | 9/2014 | Wilhelm et al. | |
| 9,132,753 | B1 | | 9/2015 | Campbell | |
| 9,969,307 | B1 | | 5/2018 | Bosen | |
| 10,052,984 | B1 | | 8/2018 | Bosen et al. | |
| 10,272,805 | B2 | | 4/2019 | Coman | |
| 10,612,616 | B1 | | 4/2020 | Lou | |
| 2013/0328364 | A1 | * | 12/2013 | Cecinas | B60N 2/42709 |
| | | | | | 297/354.1 |
| 2014/0339866 | A1 | * | 11/2014 | Olivares | B60N 2/24 |
| | | | | | 297/216.17 |

(Continued)

FOREIGN PATENT DOCUMENTS

| CN | 103273860 | | 9/2013 |
| CN | 105946667 | A * | 9/2016 |

(Continued)

*Primary Examiner* — Timothy J Brindley
(74) *Attorney, Agent, or Firm* — Mark E. Duell; Rankin, Hill & Clark LLP

(57) ABSTRACT

A vehicle assembly includes a vehicle body and a vehicle seat. The vehicle body includes a frame backing member elongated in a length direction of the vehicle seat. The vehicle seat includes a seat base and a seat back connected to the seat base. The seat back is connected to the frame backing member. A mounting bracket is connected to an upper portion of a seat back frame. An energy attenuating member positioned in a space between the seat back frame and the frame backing member interconnects the mounting bracket and the frame backing member. During a crash event the energy attenuating member is configured to collapse between the seat back and the frame backing member to absorb kinetic energy in the vehicle seat when the seat back is driven toward the frame backing member.

20 Claims, 11 Drawing Sheets

(56) References Cited

U.S. PATENT DOCUMENTS

| | | | |
|---|---|---|---|
| 2015/0360591 A1 | 12/2015 | Roll et al. | |
| 2020/0223386 A1 | 7/2020 | Phule et al. | |
| 2020/0282816 A1 | 9/2020 | Matsuda et al. | |
| 2022/0185160 A1* | 6/2022 | Pistilli | B60N 2/682 |

FOREIGN PATENT DOCUMENTS

| | | | | |
|---|---|---|---|---|
| CN | 206351644 | | 7/2017 | |
| CN | 210882119 | | 6/2020 | |
| CN | 210970748 | | 7/2020 | |
| DE | 29918981 | U1 * | 1/2000 | B60N 2/4221 |
| DE | 19949728 | A1 * | 4/2001 | B60N 2/4228 |
| DE | 102020205142 | A1 * | 10/2021 | |
| JP | 6020294 | | 10/2014 | |
| JP | 5802248 | | 10/2015 | |
| JP | 6040831 | | 12/2016 | |
| WO | WO-2007093349 | A1 * | 8/2007 | B60N 2/015 |

* cited by examiner

VEHICLE SEAT MOUNTING BRACKET FOR ENERGY ATTENUATING MEMBER

BACKGROUND

Known vehicles include structural features designed to collapse and absorb kinetic energy in a collision to safeguard occupants. In order to absorb sufficient kinetic energy in a collision, such collapsing features occupy space within a vehicle body and reduce an interior space of the vehicle available for occupants. Accordingly, there is a desire for vehicle assemblies having features that are compact during nominal operation of the vehicle, and configured to collapse during a collision to absorb kinetic energy in a collision and safeguard vehicle occupants.

BRIEF DESCRIPTION

According to one aspect, a vehicle assembly comprises a vehicle body and a vehicle seat. The vehicle body includes a frame backing member elongated in a length direction of the vehicle seat. The vehicle seat includes a seat base and a seat back connected to the seat base. The seat back is connected to the frame backing member. A mounting bracket is connected to an upper portion of a seat back frame. An energy attenuating member positioned in a space between the seat back frame and the frame backing member interconnects the mounting bracket and the frame backing member. During a crash event the energy attenuating member is configured to collapse between the seat back and the frame backing member to absorb kinetic energy in the vehicle seat when the seat back is driven toward the frame backing member.

According to another aspect, a vehicle assembly comprises a vehicle body and a vehicle seat. The vehicle body includes a frame backing member. The vehicle seat includes a seat base and a seat back connected to the seat base. An upper portion of a seat back frame is aligned with the frame backing member relative to a height direction of the vehicle assembly. An energy attenuating member is positioned in a space between the seat back frame and the frame backing member. During a crash event the energy attenuating member is configured to collapse between the seat back and the frame backing member to absorb kinetic energy in the vehicle seat when the seat back is driven toward the frame backing member. A mounting bracket is positioned at the upper portion of the seat back frame. The mounting bracket includes a first mounting part and a second mounting part extended from the first mounting part. The first mounting part is connected to the upper portion of the seat back frame, the second mounting part is connected to the energy attenuating member, and the energy attenuating member interconnects the mounting bracket and the frame backing member.

According to another aspect, a vehicle assembly comprises a vehicle body and a vehicle seat. The vehicle body includes a frame backing member. The vehicle seat includes a seat base and a seat back connected to the seat base. An energy attenuating member is positioned in a space between an upper portion of a seat back frame and the frame backing member. During a crash event the energy attenuating member is configured to collapse in a height direction of the vehicle assembly between the seat back and the frame backing member to absorb kinetic energy in the vehicle seat when the seat back is driven toward the frame backing member. A mounting bracket is positioned at the upper portion of the seat back frame. The mounting bracket includes a first mounting part and a second mounting part extended from the first mounting part toward the frame backing member. The first mounting part is adapted for connection to the upper portion of the seat back frame, the second mounting part is connected to the energy attenuating member, and the energy attenuating member interconnects the mounting bracket and the frame backing member. A seat back plate is secured between the mounting bracket and the seat back frame, the first mounting part connected to the seat back plate.

DETAILED DESCRIPTION

Figure 1:
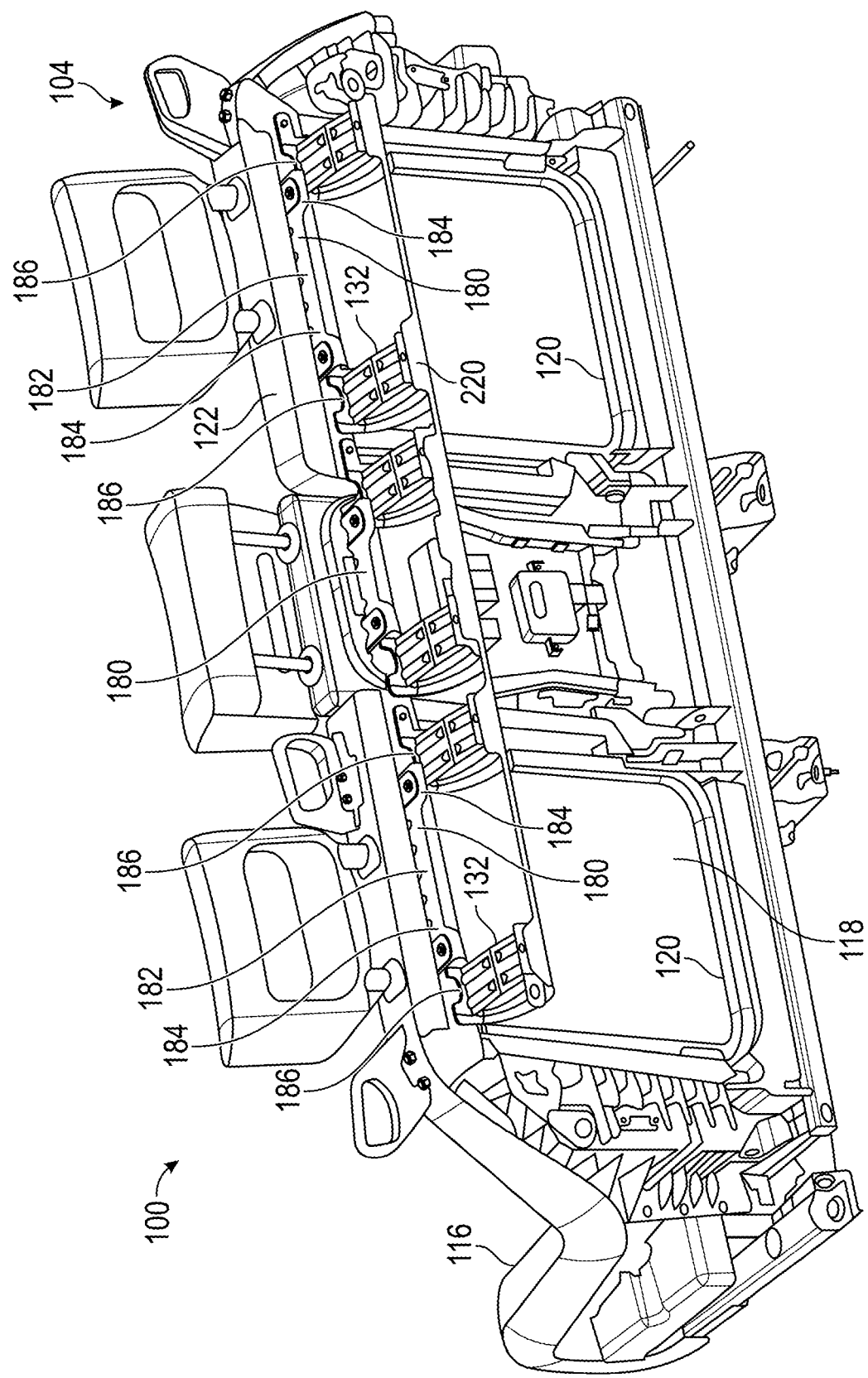
FIG. 1 is a perspective view, partially broken away, of a vehicle assembly including a vehicle seat connected to an energy attenuating member via a separate mounting bracket according to one aspect of the present disclosure.
Figure 2:
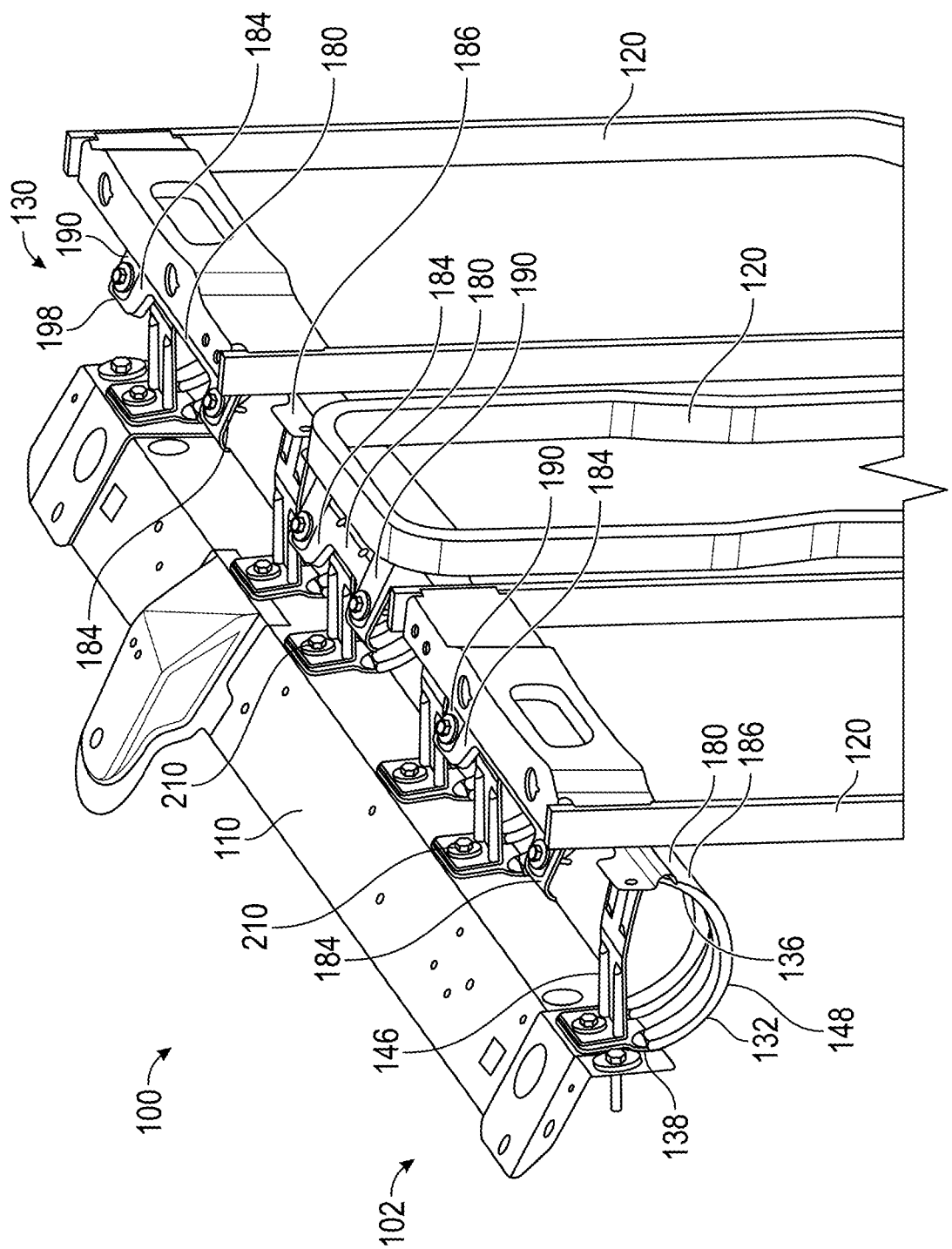
FIGS. 2 and 3 are perspective views of the vehicle assembly of FIG. 1 showing the energy attenuating member interconnecting a seat back frame and a frame backing member of a vehicle body.
Figure 3:
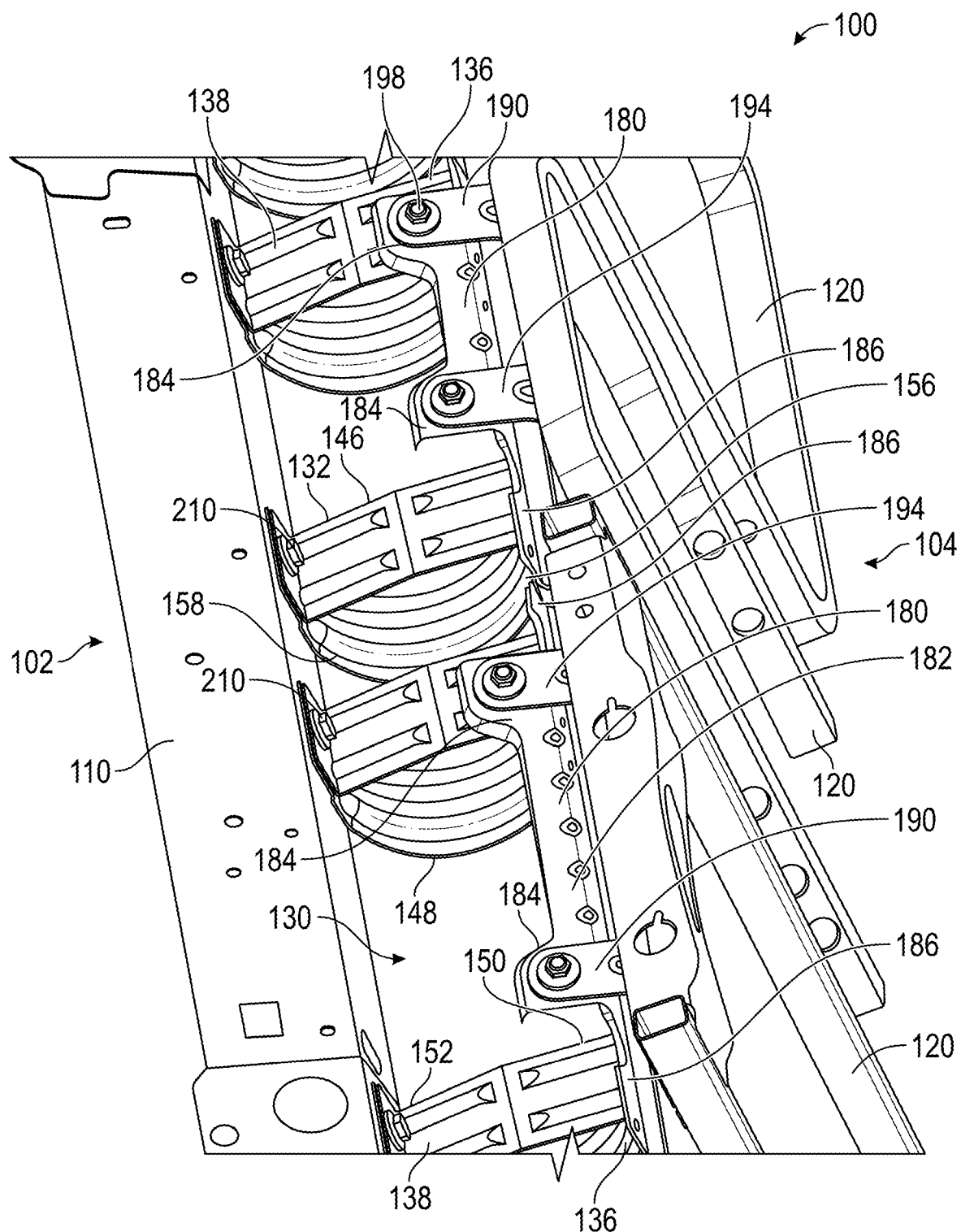

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-4 partially depict a vehicle assembly 100 according to the present disclosure. The vehicle assembly includes a vehicle body 102 and a vehicle seat 104 mounted to the vehicle body. In this example embodiment, the term "vehicle body" is used generically, and should be interpreted to include structural components of the vehicle assembly 100, such as a frame assembly. The vehicle body 102 extends in a front-rear (longitudinal) direction, a left-right (width) direction, and an up-down (height or vertical) direction of the vehicle assembly. According to one aspect, the frame assembly includes a frame backing member 110 which extends in the width direction of the vehicle assembly 100 rearward of the vehicle seat 104 in the front-rear direction. The vehicle seat 104 generally includes a seat base 116 and a seat back 118 connected to the seat base. The seat back includes a seat back frame 120 and a seat back cushion 122 mounted to the seat back frame 120, and the seat base 116 is similarly constructed. As depicted, the vehicle seat 104 can be a split-bench/split back type seat, wherein the vehicle seat 104 defines a first outboard seat, a center seat, and a second outboard seat, each independently movable relative to the other defined seats. With this arrangement, each of the first outboard seat, the center seat, and the second outboard seat includes a separate seat base 116 and seat back 118, and each seat back 118 includes a seat back frame 120.

The frame backing member 110 is elongated along a length direction of the vehicle seat (i.e., the width direction of the vehicle assembly) and is substantially aligned with an upper portion of the seat back frame 120 relative to the height direction. The frame backing member 110 is further positioned separated from the vehicle seat 104 to define a space 130 between the vehicle seat 104 and the frame backing member 110 in the front-rear direction. An energy attenuating member 132 according to one aspect of the present disclosure is positioned in the space 130 and is mounted in the space on at least one of the vehicle seat 104 and the frame backing member 110. In the depicted aspect, the energy attenuating member 132 spans between an upper portion of the seat back frame 120 and the frame backing member 110 in both the front-rear direction and the height direction, with a proximal end portion 136 connected to the upper portion of the seat back frame 120 and a distal end portion 138 connected to the frame backing member 110.

Figure 4:
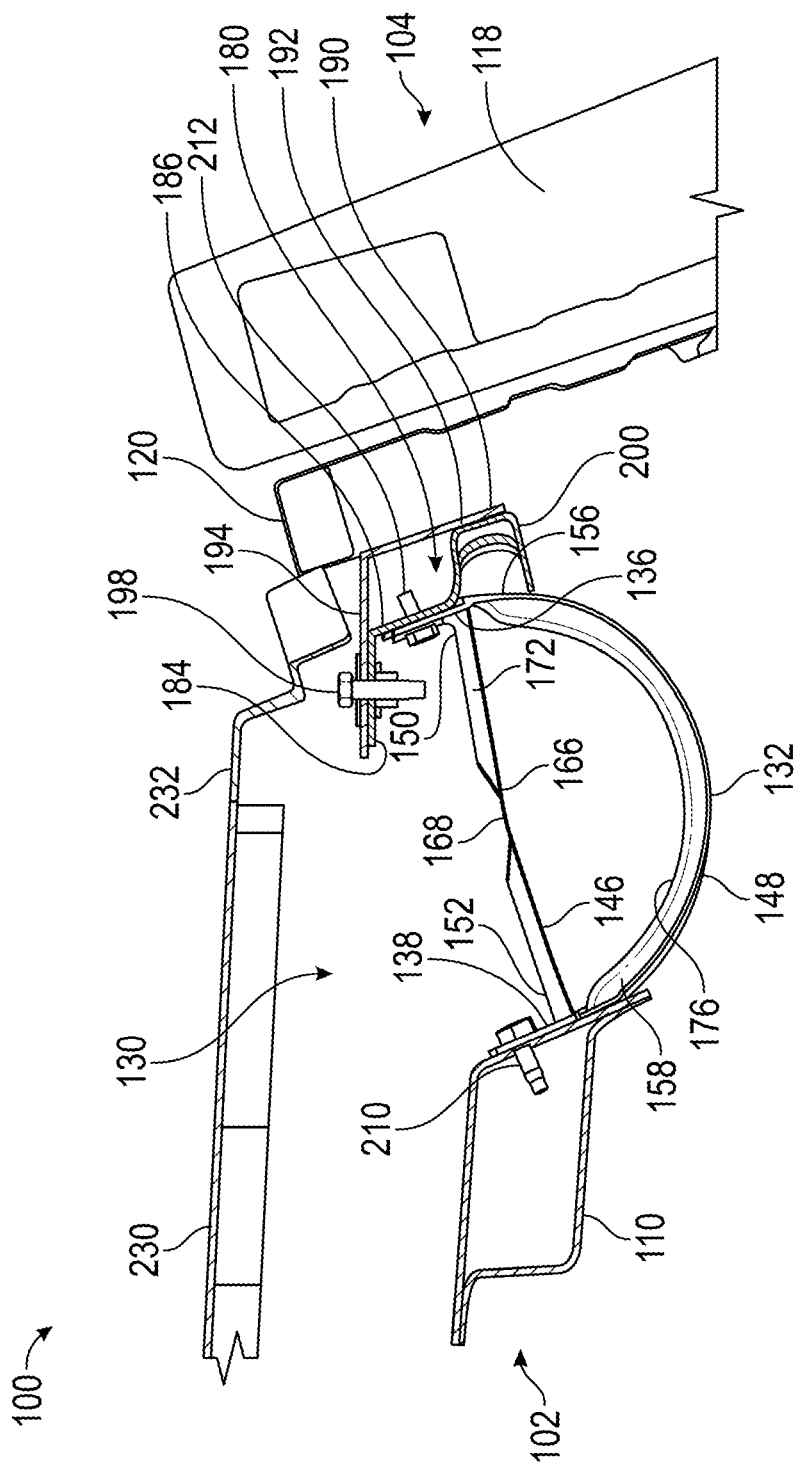
FIGS. 4 and 5 are partial cross-sectional views of the vehicle assembly of FIG. 1.
Figure 5:
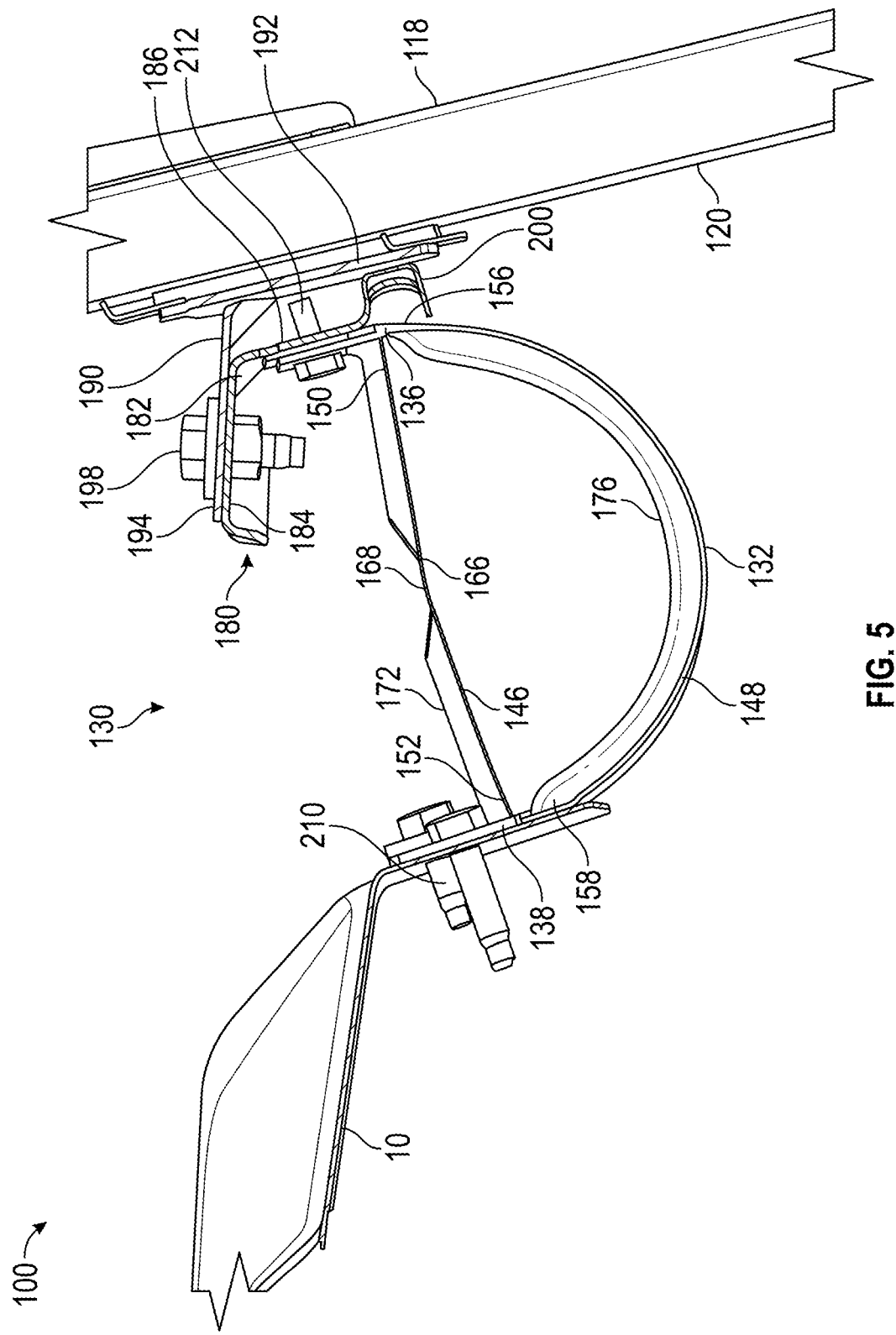

In the illustrated embodiment of FIGS. 4 and 5, the energy attenuating member 132 includes a first wall section 146 and a second wall section 148 extended across the space 130 and configured to collapse between the vehicle seat 104 and the frame backing member 110 during a crash event. The first wall section 146 extends across the space between the seat back frame 120 and the frame backing member 110 to have a proximal end portion 150 forming the proximal end portion 136 of the energy attenuating member 132, and to have a distal end portion 152 forming the distal end portion 138 of the energy attenuating member 132. Similarly, the second wall section 148 extends across the space between the seat back frame 120 and the frame backing member 110 to have a proximal end portion 156 forming the proximal end portion 136 of the energy attenuating member 132, and to have a distal end portion 158 forming the distal end portion 138 of the energy attenuating member 132.

The second wall section 148 extends around the first wall section 146 such that the first wall section 146 is interposed between and separates the proximal end portion 156 of the second wall section 148 and the distal end portion 158 of the second wall section 148 in the front-rear direction of the vehicle assembly 100. With this construction, the proximal end portion 156 of the second wall section 148 is interposed between and separates the vehicle seat 104 and the proximal end portion 150 of the first wall section 146, and the distal end portion 158 of the second wall section 148 is interposed between and separates the distal end portion 152 of the first wall section 146 and the frame backing member 110.

With continued reference to FIGS. 2-5, the proximal end portion 150 of the first wall section 146 is fixed with the proximal end portion 156 of the second wall section 148 to form the proximal end portion 136 of the energy attenuating member 132. Similarly, the distal end portion 152 of the first wall section 146 is fixed with the distal end portion 158 of the second wall section 148 to form the distal end portion 138 of the energy attenuating member 132. In the depicted embodiment, the proximal end portion 150 of the first wall section 146 is fixed with the proximal end portion 156 of the second wall section 148 by crimping the proximal end portion 150 of the first wall section 146 with the proximal end portion 156 of the second wall section 148, and the distal end portion 152 of the first wall section 146 is fixed with the distal end portion 158 of the second wall section 148 by crimping the distal end portion 152 of the first wall section 146 with the distal end portion 158 of the second wall section 148. However, it should be appreciated that the first wall section 146 and the second wall section 148 may additionally and/or alternatively be fixed together with adhesive, welding, or fasteners without departing from the scope of the present disclosure.

Figure 6:
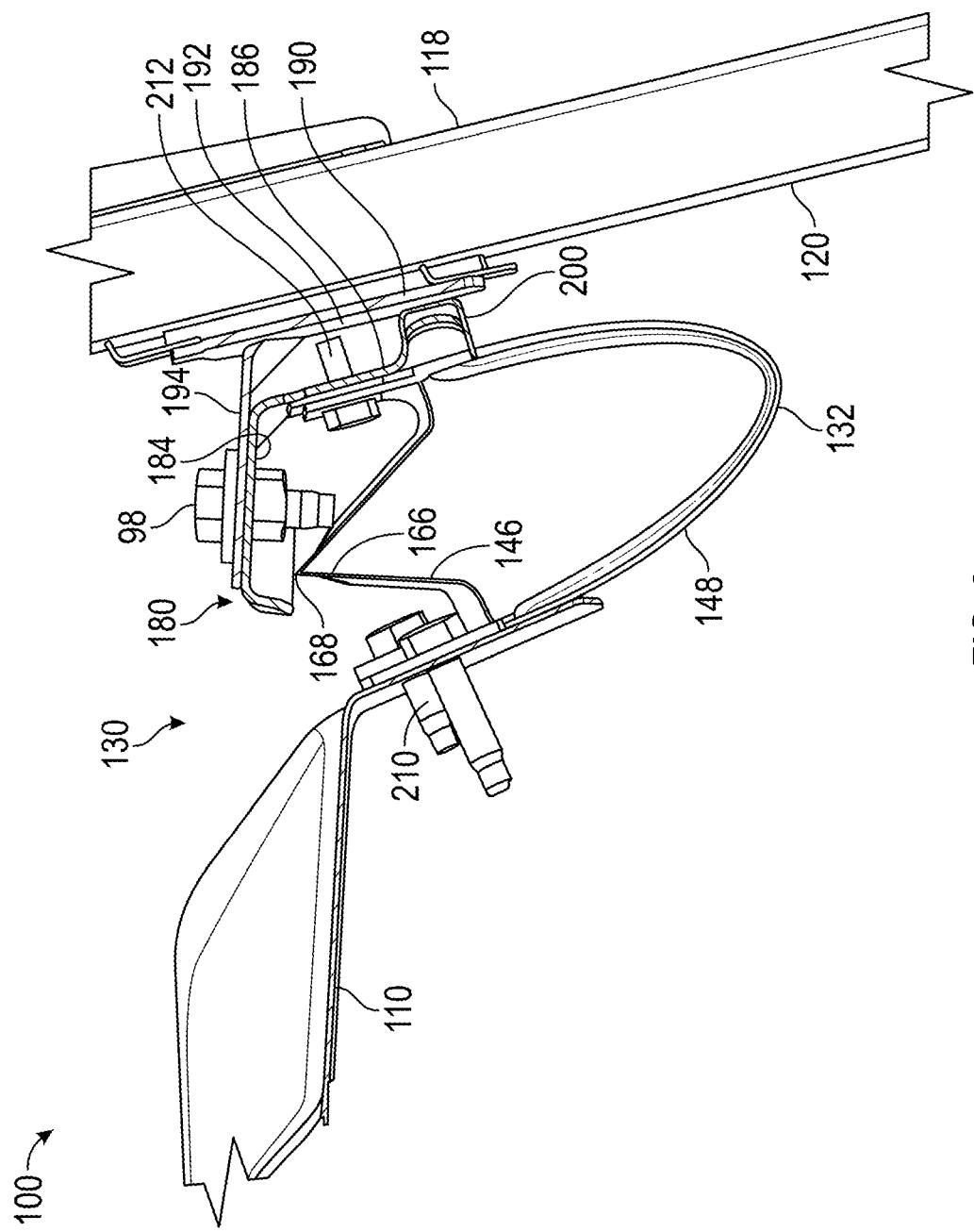
FIG. 6 is a partial cross-section view showing the energy attenuating member of FIG. 5 in a collapsed state.

Further, in a side view of the energy attenuating member 132 the second wall section 148 is bent around the first wall section 146 to have a U-shaped profile. The second wall section 148 is secured beneath the first wall section 146 relative to the height direction of the vehicle assembly. In FIGS. 5 and 6, during a crash event the energy attenuating member 132 is configured to collapse between the seat back 118 and the frame backing member 110 to absorb kinetic energy in the vehicle seat 104 when the seat back is driven toward the frame backing member. In this regard, a central portion 166 of the first wall section 146 can be formed with a kink or bend 168 directed in a fold direction of the first wall section 146 when the energy attenuating member 132 collapses between the seat back 118 and the frame backing member 110. As shown, the kink or bend 168 is in height direction.

Therefore, when the energy attenuating member 132 collapses between the vehicle seat 104 and the frame backing member 110, a fold formed in the first wall section 146 is directed away from the second wall section 148. In addition, to ensure proper folding of energy attenuating member 132, the first wall section 146 can be formed with at least one first strengthening rib 172 extended between the proximal end portion 136 and the distal end portion 138 of the energy attenuating member 132. As shown, the first strengthening rib can be bifurcated by the kink or bend 168. The second wall section 148 can be formed with at least one second strengthening rib 176 extended continuously between the proximal end portion 136 and a distal end portion 138 of the energy attenuating member 132. However, it should be appreciated that the first wall section 146 may be configured to feature multiple kinks or bends and, in turn, multiple folds between the proximal end portion 150 of the first wall section 146 and the distal end portion 152 of the first wall section 146 when the energy attenuating member 132 collapses between the vehicle seat 104 and the frame backing member 110 without departing from the scope of the present disclosure.

Figure 7:
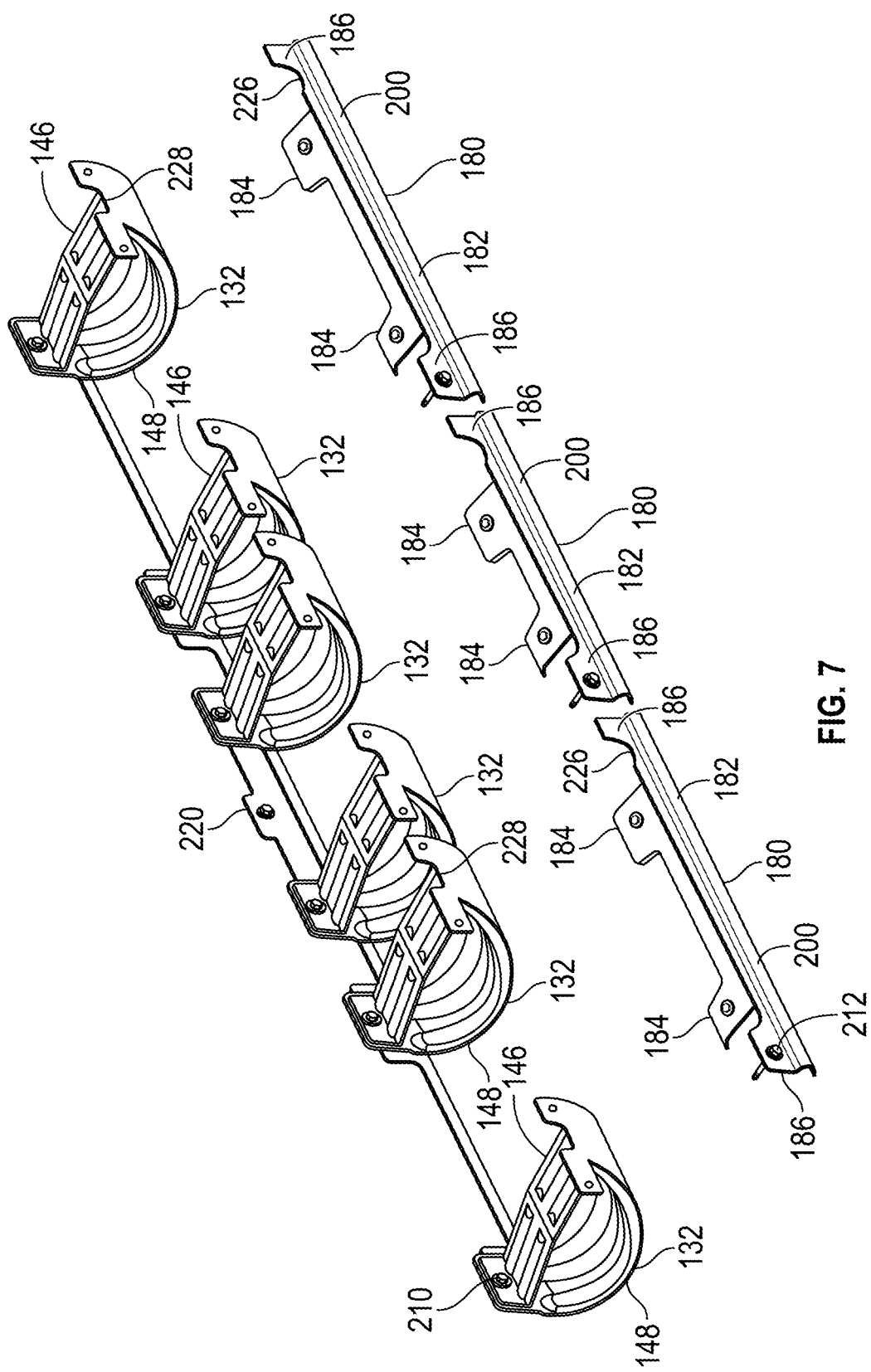
FIG. 7 is a perspective view showing the mounting bracket and the energy attenuating member of FIG. 1.

A mounting bracket 180 according to one aspect of the present disclosure is provided to secure the energy attenuating member 132 to the seat back frame 120. The mounting bracket 180, which is separate from the vehicle seat 104 and is positioned at and connected to the upper portion of the seat back frame 120, includes a body 182 with a first mounting part 184 and a second mounting part 186 extended from the first mounting part. The first mounting part 184 is adapted for connection to the upper portion of the seat back frame 120, the second mounting part 186 is adapted for connection to the energy attenuating member 132, and the energy attenuating member 132 interconnects the mounting bracket 180 and the frame backing member 110. More particularly, in FIG. 7, the body 182 of the mounting bracket 180 is substantially L-shaped with the first mounting part 184 offset from the second mounting part 186 in a length direction of the mounting bracket (i.e., the width direction of the vehicle assembly 100). This positions the connection of the mounting bracket 180 to the seat back frame 120 inside of the connection of the mounting bracket 180 to the energy attenuating member 132. Further, in the depicted aspect of FIGS. 1 and 2, the upper portion of the seat back frame 120 has a substantially inverted U-shape, and the offset relationship between the first and second mounting parts 184, 186 locates the second mounting part at an outermost section of the upper portion of the seat back frame 120. Additionally, in the depicted aspect the mounting bracket 180 is adapted for connection of two energy attenuating members 132. With this arrangement of the mounting bracket 180, a pair of first mounting parts 184 is provided to secure the mounting bracket 180 to the seat back frame 120, and a pair of second mounting parts 186 are provided for the two energy attenuating members 132. The mounting bracket 180 is sized to span approximately an entire width of the seat back frame 120, with the first mounting parts 184 offset from the second mounting parts 186. As shown, the first mounting parts 184 are substantially inside of and flanked by the second mounting parts 186, the second mounting parts constituting opposite end portions of the mounting bracket 180.

According to the present disclosure, the mounting bracket 180 is indirectly connected to the seat back frame 120 and directly connected to the energy attenuating member 132. To this end, a seat back plate 190 according to one aspect that is separate from the mounting bracket and the seat back frame 120 is positioned between the mounting bracket and the seat back frame. The seat back plate 190 is substantially L-shaped with a first section 192 secured (for example, welded) to the seat back frame 120 and a second section 194 extended from the first section and overlaying the first mounting part 184. The second section 194 is fastened to the first mounting part 184 by, for example, a bolt 198. The second mounting part 186 is spaced from the seat back frame 120 via a leg member 200 of the mounting bracket body 182 engaging the first section 192 of the seat back plate 190. Therefore, when mounted, the first mounting part 184 extends substantially perpendicular to the seat back frame 120 toward the frame backing member 110, and the second mounting part 186 extends substantially parallel to the seat back frame 120. In the depicted embodiment, the energy attenuating member 132 is fastened to the frame backing member 110 and the second mounting part 186 of the mounting bracket via, for example, bolts 210, 212, and the spacing between the second mounting part 186 and the first section 192 allows for the fastened connection of the energy attenuating member 132 to the second mounting part 186. It should be appreciated that the bolted attachment of the energy attenuating member 132 prevents the proximal and distal end portions 136, 138 of the energy attenuating member 132 from rotating during an impact event as the energy attenuating member 132 is collapsed between the seat back 118 and the frame backing member 110. It should be appreciated that in lieu of the bolts, the energy attenuating member 132 can be adhered and/or welded to the frame backing member 110 and the second mounting part 186 of the mounting bracket 180 without departing from the scope of the present disclosure. It should be further appreciated that a mounting plate 220 (FIGS. 1 and 7) may be provided between the energy attenuating member 132 and the frame backing member 110 to facilitate the bolted attachment to the frame backing member. Additionally, in FIG. 7 the mounting bracket 180 can be formed with a first locating feature 226 (for example, a first cutout) and the energy attenuating member 132 can be formed with a second locating feature 228 (for example, a second cutout) shaped complimentary to the first locating feature to ensure proper positioning of the energy attenuating member 132 relative to the mounting bracket 180.

With reference to FIG. 4, the vehicle body 102 includes an interior panel 230 sized to cover the space 130 between the seat back frame 120 and the frame backing member 110. In the depicted aspect, the interior panel 230 includes a removable tray cap 232 which is aligned with the connection (i.e., the bolt 198) between the second section 194 of the seat back plate 190 and the first mounting part 184 of the mounting bracket 180. The removable tray cap 232 provide access to this connection for ease of assembly and maintenance.

Figure 8:
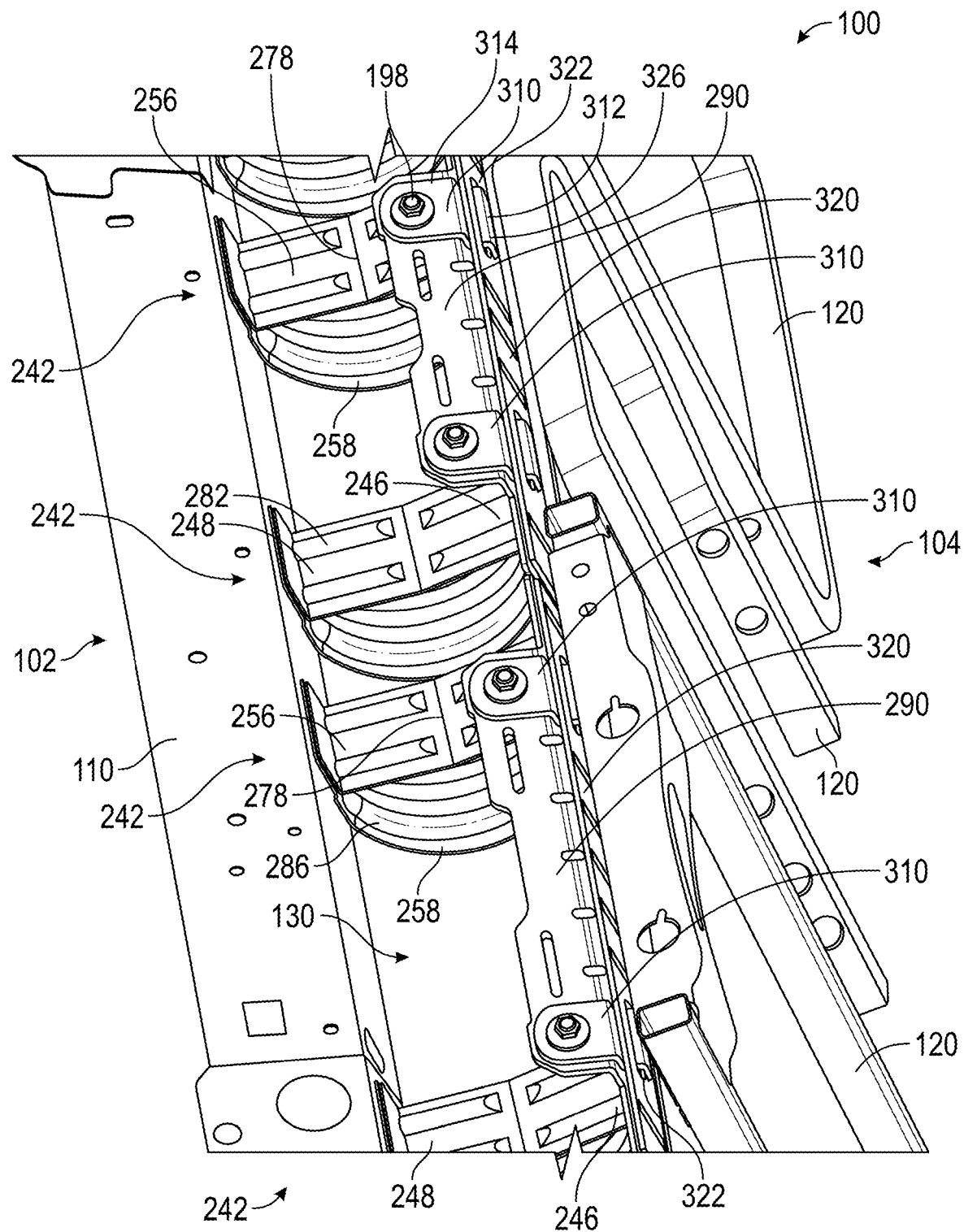
FIG. 8 is a perspective view of the vehicle assembly showing an energy attenuating member interconnecting a seat back frame and a frame backing member of the vehicle body according to another aspect of the present disclosure.

FIG. 8 depicts an energy attenuating member 242 according to another aspect of the present disclosure. Similar to the aspect described above, the energy attenuating member 242 is positioned in the space 130 and is mounted in the space on at least one of the vehicle seat 104 and the frame backing member 110. A proximal end portion 246 of the energy attenuating member 242 is connected to the upper portion of the seat back frame 120 and a distal end portion 248 is connected to the frame backing member 110.

Figure 10:
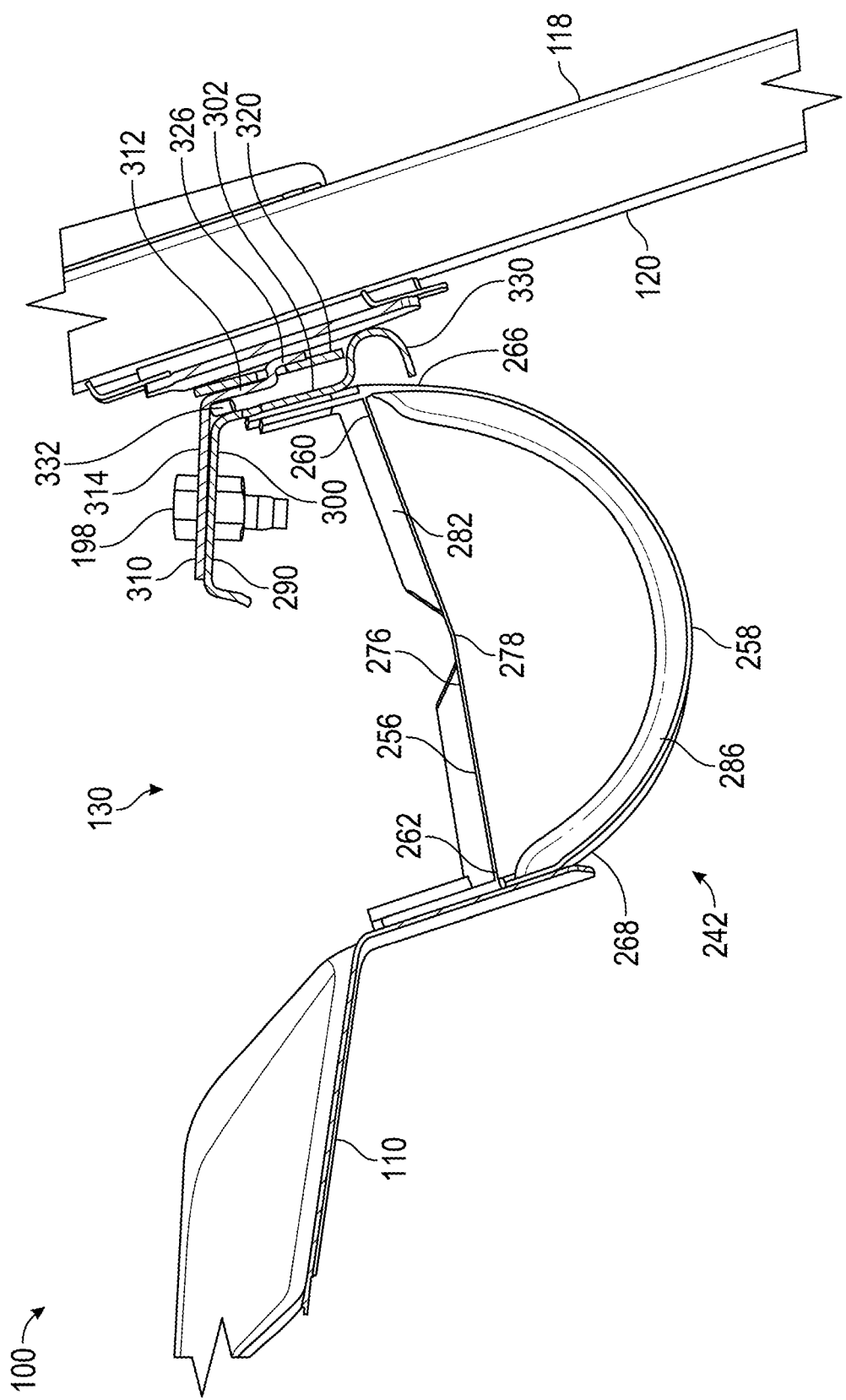
FIG. 10 is a partial cross-sectional view of the vehicle assembly of FIG. 8.
Figure 11:
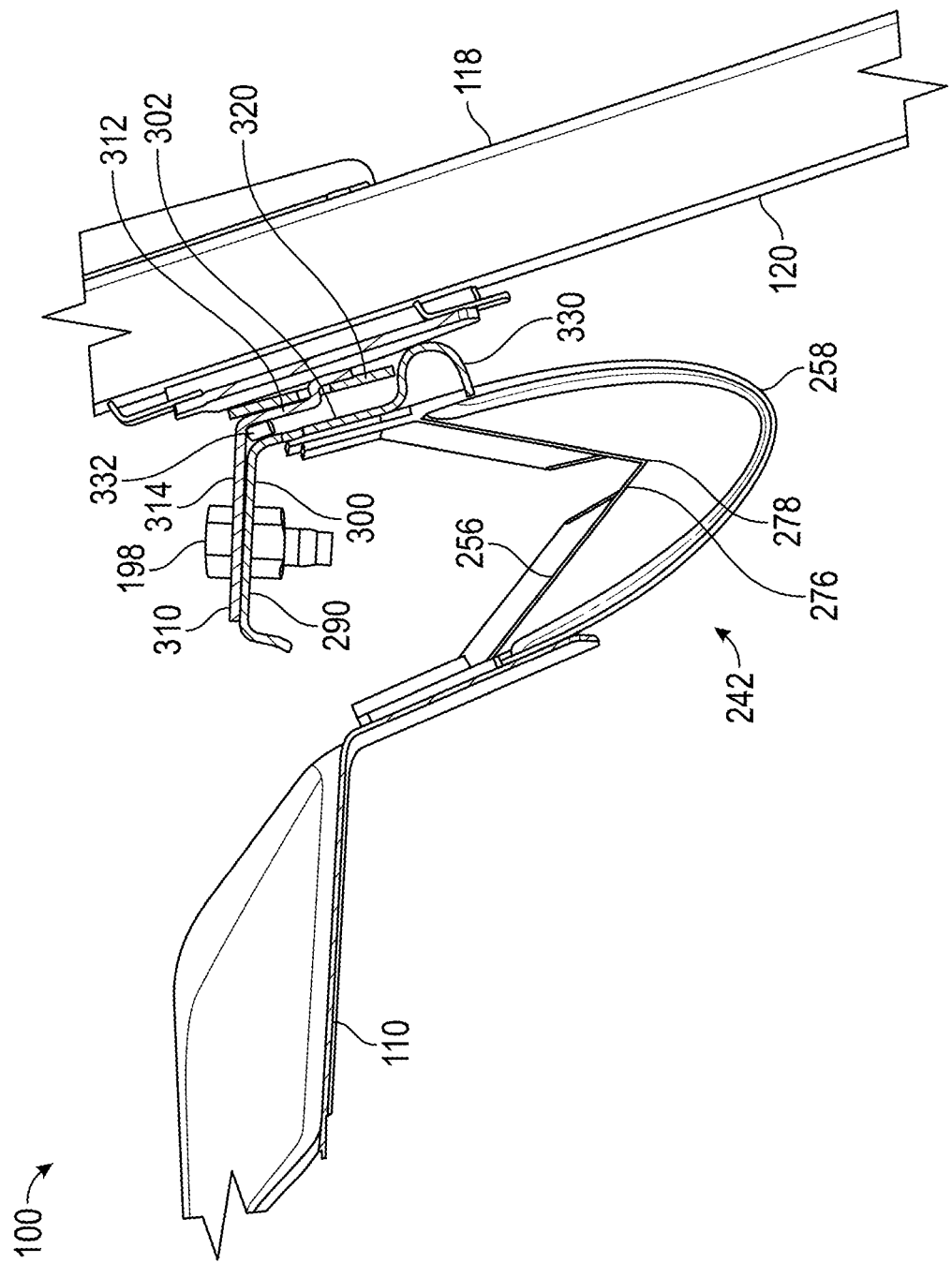
FIG. 11 is a partial cross-section view showing the energy attenuating member of FIG. 10 in a collapsed state.

In the illustrated embodiment of FIGS. 10 and 11, the energy attenuating member 242 includes a first wall section 256 and a second wall section 258 extended across the space 130 and configured to collapse between the vehicle seat 104 and the frame backing member 110 during a crash event. The first wall section 256 extends across the space between the seat back frame 120 and the frame backing member 110 to have a proximal end portion 260 forming the proximal end portion 246 of the energy attenuating member 242, and to have a distal end portion 262 forming the distal end portion 248 of the energy attenuating member 242. Similarly, the second wall section 258 extends across the space between the seat back frame 120 and the frame backing member 110 to have a proximal end portion 266 forming the proximal end portion 246 of the energy attenuating member 242, and to have a distal end portion 268 forming the distal end portion 248 of the energy attenuating member 242.

The second wall section 258 extends around the first wall section 256 such that the first wall section 256 is interposed between and separates the proximal end portion 266 of the second wall section 258 and the distal end portion 268 of the second wall section 258 in the front-rear direction of the vehicle assembly 100. The proximal end portion 260 of the first wall section 246 is fixed with the proximal end portion 256 of the second wall section 258 to form the proximal end portion 246 of the energy attenuating member 242. Similarly, the distal end portion 262 of the first wall section 256 is fixed with the distal end portion 258 of the second wall section 258 to form the distal end portion 248 of the energy attenuating member 242.

Further, in a side view of the energy attenuating member 242 the second wall section 258 is bent around the first wall section 256 to have a U-shaped profile. The second wall section 258 is secured beneath the first wall section 256 relative to the height direction of the vehicle assembly. Similar to the previously described aspect, in FIGS. 10 and 11, during a crash event the energy attenuating member 242 is configured to collapse between the seat back 118 and the frame backing member 110 to absorb kinetic energy in the vehicle seat 104 when the seat back is driven toward the frame backing member. In this regard, a central portion 276 of the first wall section 256 can be formed with a kink or bend 278 directed in a fold direction of the first wall section 256 when the energy attenuating member 242 collapses between the seat back 118 and the frame backing member 110. As shown, the kink or bend 168 is in height direction.

Therefore, in this aspect of the present disclosure, when the energy attenuating member 242 collapses between the vehicle seat 104 and the frame backing member 110, a fold formed in the first wall section 256 is directed toward from the second wall section 258. In addition, to ensure proper folding of energy attenuating member 242, the first wall section 256 can be formed with at least one first strengthening rib 282 which can be bifurcated by the kink or bend 278, and the second wall section 258 can be formed with at least one second strengthening rib 286. Again, it should be appreciated that the first wall section 256 may be configured to feature multiple kinks or bends and, in turn, multiple folds between the proximal end portion 260 of the first wall section 256 and the distal end portion 262 of the first wall section 256 when the energy attenuating member 242 collapses between the vehicle seat 104 and the frame backing member 110 without departing from the scope of the present disclosure.

Figure 9:
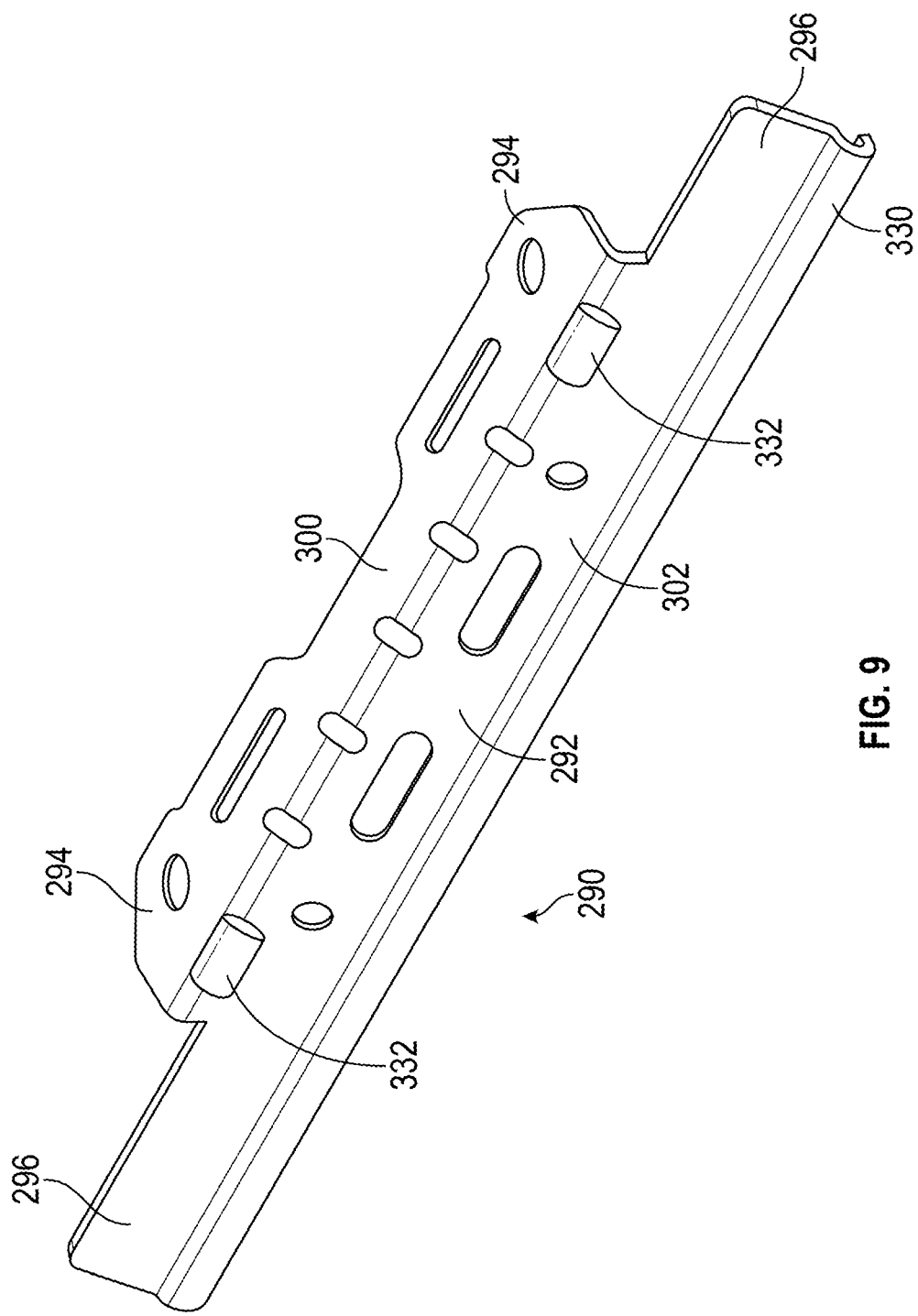
FIG. 9 is a perspective view showing the mounting bracket of FIG. 8.

A mounting bracket 290 according to another aspect of the present disclosure, that again is separate from the vehicle seat 104, is provided to secure the energy attenuating member 242 (or the energy attenuating member 132) to the seat back frame 120. In FIG. 9, the mounting bracket 290, which is positioned at and connected to the upper portion of the seat back frame 120, includes a body 292 with a first mounting part 294 and a second mounting part 296 extended from the first mounting part. The first mounting part 294 is adapted for connection to the upper portion of the seat back frame 120, the second mounting part 296 is adapted for connection to the energy attenuating member 242, and the energy attenuating member 242 interconnects the mounting bracket 290 and the frame backing member 110. More particularly, and similar to the mounting bracket 180 (which can also be used for mounting of the energy attenuating member 242), the body 292 of the mounting bracket 290 is substantially L-shaped having a first body part 300 and a second body part 302 extending from the first body part. The first mounting part 296 defined an end portion of the first body part 300 and the second mounting part 296 defines an end portion of the second body part 302, with the first mounting part 294 offset from the second mounting part 296 in a length direction of the mounting bracket (i.e., the width direction of the vehicle assembly 100). This positions the connection of the mounting bracket 290 to the seat back frame 120 inside of the connection of the mounting bracket 290 to the energy attenuating member 242. Additionally, in the depicted aspect the mounting bracket 290 is adapted for connection of two energy attenuating members 242, including a pair of first mounting parts 294 (defining opposite end portions of the first body part 300) provided to secure the mounting bracket 290 to the seat back frame 120, and a pair of second mounting parts 296 (defining opposite end portions of the second body part 302) provided for the two energy attenuating members 242.

Similar to the mounting bracket 180, the mounting bracket 290 is indirectly connected to the seat back frame 120 and directly connected to the energy attenuating member 242. To this end, a seat back plate 310 according to another aspect separate from the mounting bracket 290 and the seat back frame 120 is positioned between the mounting bracket and the seat back frame. The seat back plate 310 is substantially L-shaped with a first section 312 and a second section 314. The first section 312 is adapted for connection to a seat back connecting plate 320 secured (for example, welded) to the seat back frame 120. As shown in FIG. 8, the connecting plate 320 is provided with an opening 322 sized to receive the first section 312. More particularly, the first section 312 includes a stepped configuration such that an end portion 326 of the first section 312 is fitted in the opening 322 and located between the seat back frame 120 and the connecting plate 320, with the remaining portion of the first section spaced from the connecting plate 320 toward the second body part 302 of the mounting bracket 290. The second section 314 is extended from the first section 312 and overlaying the first mounting part 294. The second section 314 is fastened to the first mounting part 294 by, for example, the bolt 198. The second mounting part 296 is spaced from the seat back frame 120 via both a leg member 330 of the mounting bracket body 292 engaging one of the seat back frame 120 and the connecting plate 320 and a stopper 332 formed on the body 292 engaging the first section 312 of the seat back plate 310. Therefore, when mounted, the first mounting part 292 extends substantially perpendicular to the seat back frame 120 toward the frame backing member 110, and the second mounting part 294 extends substantially parallel to the seat back frame 120. In the depicted embodiment, the energy attenuating member 242 is welded or adhered to the mounting bracket 290 and the frame backing member 110. It should be further appreciated that the mounting plate 220 (FIGS. 1 and 7) and be provided between the energy attenuating member 242 and the frame backing member 110 to facilitate the attachment to the frame backing member. In addition, as described above the interior panel 230 is sized cover the space 130 between the seat back frame 120 and the frame backing member 110 including the energy attenuating member 242.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle assembly comprising:
   a vehicle body including a frame backing member; and
   a vehicle seat including a seat base and a seat back connected to the seat base, the seat back connected to the frame backing member, the frame backing member elongated in a length direction of the vehicle seat,
   wherein a mounting bracket is connected to an upper portion of a seat back frame, an energy attenuating member positioned in a space between the seat back frame and the frame backing member interconnects the mounting bracket and the frame backing member, wherein during a crash event the energy attenuating member is configured to collapse and fold relative to a height direction of the vehicle assembly between the seat back and the frame backing member to absorb kinetic energy in the vehicle seat when the seat back is driven toward the frame backing member.

2. The vehicle assembly of claim 1, wherein the mounting bracket includes a first mounting part and a second mounting part extended from the first mounting part, the first mounting part adapted for connection to the seat back frame, the second mounting part adapted for connection to the energy attenuating member.

3. The vehicle assembly of claim 2, wherein the first mounting part extends substantially perpendicular to the seat back frame, and the second mounting part extends substantially parallel to the seat back frame.

4. The vehicle assembly of claim 3, including a seat back plate secured between the mounting bracket and the seat back frame, the first mounting part connected to the seat back plate.

5. The vehicle assembly of claim 4, wherein the second mounting part is spaced from the seat back frame via a leg member of the mounting bracket.

6. The vehicle assembly of claim 4, including a seat back connecting plate secured to the seat back frame, the seat back plate mounted to the connecting plate.

7. The vehicle assembly claim 2, wherein the energy attenuating member includes a first wall section and a separate second wall section secured to the first wall section, wherein in a side view of the energy attenuating member the second wall section is bent around the first wall section to have a U-shaped profile.

8. The vehicle assembly of claim 7, wherein the second wall section is secured beneath the first wall section relative to the height direction of the vehicle assembly.

9. The vehicle assembly of claim 7, wherein a central portion of the first wall section is formed with a kink or bend directed in a fold direction of the first wall section when the energy attenuating member collapses between the seat back and the frame backing member.

10. The vehicle assembly of claim 9, wherein the first wall section is formed with at least one first strengthening rib extended between a proximal end portion and a distal end portion of the energy attenuating member, the first strengthening rib bifurcated by the kink or bend, and the second wall section is formed with at least one second strengthening rib extended continuously between the proximal end portion and the distal end portion.

11. The vehicle assembly of claim 1, wherein the vehicle body includes an interior panel sized to cover the space between the seat back frame and the frame backing member, the interior panel including a removable tray cap proving access to the connection between the mounting bracket and the seat back frame.

12. A vehicle assembly comprising:
a vehicle body including a frame backing member;
a seat having a seat base and a seat back connected to the seat base, an upper portion of a seat back frame aligned with the frame backing member relative to a height direction of the vehicle assembly;
an energy attenuating member positioned in a space between the seat back frame and the frame backing member, wherein during a crash event the energy attenuating member is configured to collapse and fold relative to the height direction of the vehicle assembly between the seat back and the frame backing member to absorb kinetic energy in the vehicle seat when the seat back is driven toward the frame backing member; and
a mounting bracket positioned at the upper portion of the seat back frame, the mounting bracket includes a first mounting part and a second mounting part extended from the first mounting part, the first mounting part adapted connected to the upper portion of the seat back frame, the second mounting part connected to the energy attenuating member, and the energy attenuating member interconnects the mounting bracket and the frame backing member.

13. The vehicle assembly of claim 12, wherein the first mounting part overlies the connection of the energy attenuating member and the second mounting part in the height direction of the vehicle assembly.

14. The vehicle assembly of claim 12, including a seat back plate secured between the mounting bracket and the seat back frame, the first mounting part connected to the seat back plate.

15. The vehicle assembly of claim 14, wherein the second mounting part is spaced from the seat back frame via a leg member of the mounting bracket, the leg member positioned beneath the connection of energy attenuating member and the second mounting part in the height direction of the vehicle assembly.

16. The vehicle assembly of claim 12, wherein the energy attenuating member includes a first wall section and a second wall section separate from the first wall section and looped beneath the first wall section relative to the height direction of the vehicle assembly.

17. The vehicle assembly of claim 16, wherein the first wall section is interposed between and separates a proximal end portion of the second wall section and a distal end portion of the second wall section in a direction taken from the seat back to the frame backing member.

18. The vehicle assembly of claim 12, wherein the frame backing member is elongated in a length direction of the vehicle seat, and the vehicle body includes an interior panel sized to cover the space between the seat back frame and the frame backing member, the interior panel including a removable cap providing access to the connection between the first mounting part and the seat back frame.

19. A vehicle assembly comprising:
a vehicle body including a frame backing member;
a seat having a seat base and a seat back connected to the seat base;
an energy attenuating member positioned in a space between an upper portion of a seat back frame and the frame backing member, wherein during a crash event the energy attenuating member is configured to collapse in a height direction of the vehicle assembly between the seat back and the frame backing member to absorb kinetic energy in the vehicle seat when the seat back is driven toward the frame backing member;
a mounting bracket positioned at the upper portion of the seat back frame, the mounting bracket includes a first mounting part and a second mounting part extended from the first mounting part toward the frame backing member, the first mounting part adapted for connection to the upper portion of the seat back frame, the second mounting part connected to the energy attenuating member, and the energy attenuating member interconnects the mounting bracket and the frame backing member; and
a seat back plate secured between the mounting bracket and the seat back frame, the first mounting part connected to the seat back plate.

20. The vehicle assembly of claim 19, wherein the vehicle body includes an interior panel sized to cover the space between the seat back frame and the frame backing member, the interior panel including a removable cap providing access to the connection between the first mounting part and the seat back plate.

* * * * *